United States Patent [19]

Hansen

[11] 4,195,905

[45] Apr. 1, 1980

[54] AUTOMATIC BIAXIAL SUN TRACKING MECHANISM FOR SOLAR ENERGY UTILIZATION DEVICES

[76] Inventor: Paul A. Hansen, 435 Dogwood Rd., West Columbia, S.C. 29169

[21] Appl. No.: 889,215

[22] Filed: Mar. 23, 1978

[51] Int. Cl.$^2$ .......................... G02B 7/18; F16H 25/16
[52] U.S. Cl. .......................................... 350/83; 74/53
[58] Field of Search ................ 350/83, 289, 292, 293, 350/299; 126/270, 271; 353/3; 74/53

[56] References Cited

U.S. PATENT DOCUMENTS

| 496,959 | 5/1893 | Severy | 126/270 |
|---|---|---|---|
| 497,079 | 5/1893 | Severy | 126/270 |
| 3,893,746 | 7/1975 | McMahon | 350/83 |
| 3,996,917 | 12/1976 | Trihey | 126/271 |
| 4,011,854 | 3/1977 | Brantley et al. | 126/270 |

*Primary Examiner*—Jon W. Henry

[57] ABSTRACT

The instant invention is an automatic biaxial sun tracking mechanism for use with solar energy utilization devices. Said devices are mounted on said invention, said devices forming no specific part of said invention. The invention is comprised of three principal parts: (1) a polar shaft, (2) a declination disk, and (3) a mount structure for positioning and supporting said solar energy utilization devices. Operation of the invention is as follows: Said declination disk, which is rotatably connected to said polar shaft, causes said mount structure, which is pivotly connected to said polar shaft and also has moving contact with said declination disk, to move in its proper declination course while said mount structure simultaneously moves in its proper right ascension course about the longitudinal axis of said polar shaft. The invention may incorporate compensating means to improve tracking accuracy. Proper operating movements are provided by suitable gearing and drive mechanisms. Said mount structure for positioning and supporting said solar energy utilization devices has three principal configurations in order to provide adequate options for receiver target location, said receiver target location being either integral with said solar energy utilization device (moving target) or external to said solar energy utilization device (stationary target).

10 Claims, 13 Drawing Figures

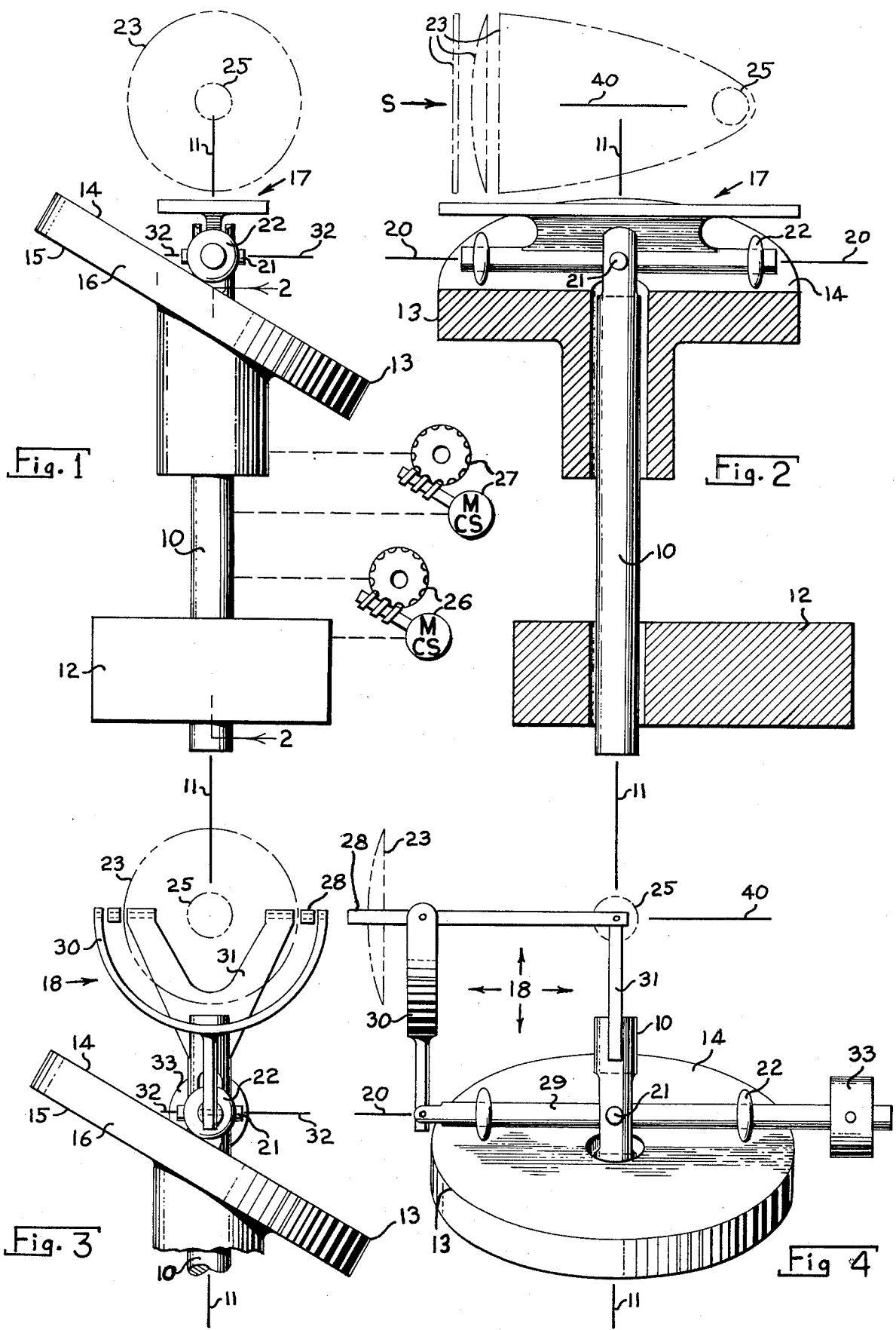

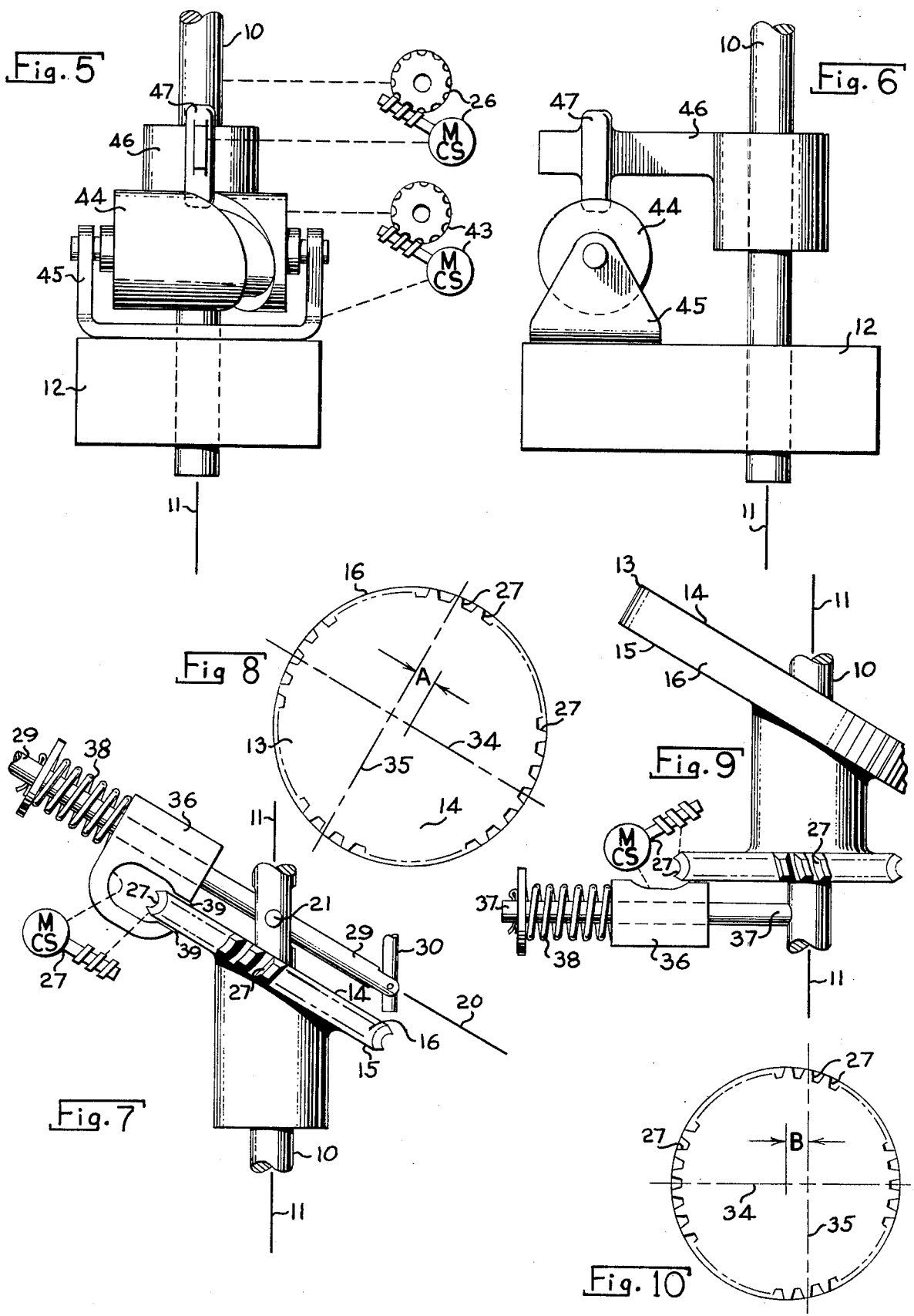

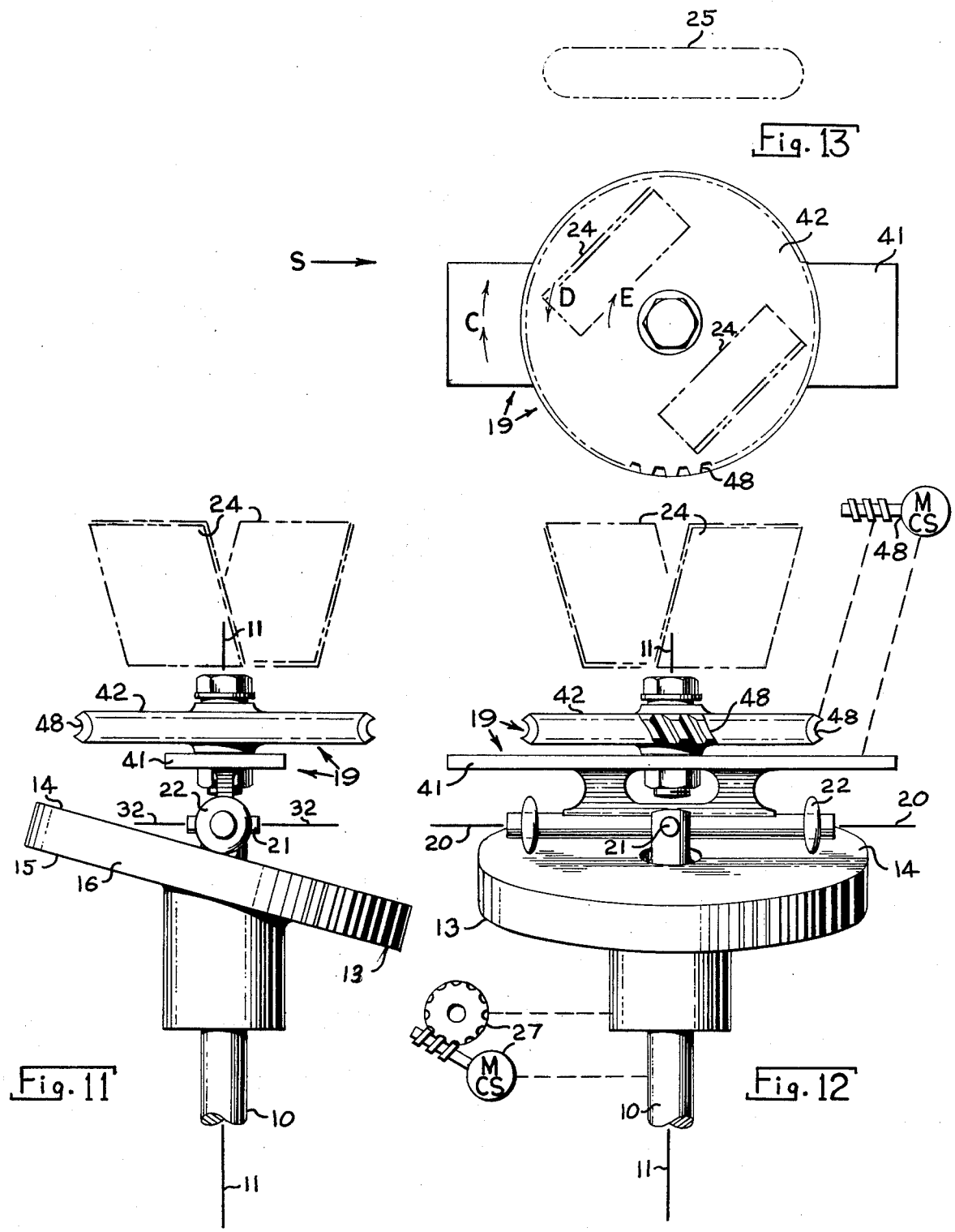

AUTOMATIC BIAXIAL SUN TRACKING MECHANISM FOR SOLAR ENERGY UTILIZATION DEVICES

OLD METHODS AND UNDERLYING PRINCIPLES

Present sun tracking devices are of two basic types: Electronic, and Mechanical. Electronic trackers operate on the principle of sensing and correcting for errors. Mechanical trackers operate on the principle of following the predictable apparent course of the sun.

It is the inventor's opinion that the mechanical principle is superior and offers the possibility of the most direct, accurate and inexpensive means of sun tracking. Present mechanical sun tracking devices have not taken long range operation into sufficient consideration, since frequent manual adjustments are needed to maintain satisfactory mechanical sun tracking.

PRINCIPAL ADVANTAGES OF THE INVENTION

The invention disclosed herein is a mechanical tracker. It can be easily manufactured. It is as good as electronic trackers from the standpoint of automation. It is better than electronic trackers in the following ways:

1. It is more accurate in that it constantly follows the sun's apparent course rather than requiring periodic errors for stop-and-go operation.
2. It is more reliable in that it consists of a simple mechanical construction which is strong and rigid, able to withstand adverse weather conditions.
3. It is less costly to maintain in that its mechanical construction offers fewer possible malfunctions, and any malfunction which may occur promises to be obvious and easily corrected by the layman.

INVENTOR'S IMPROVEMENT AND UNDERLYING PRINCIPLES

The inventor found that the equatorial amount, which has a rotating polar shaft, presented the best basis for automatically following the sun in its right ascension course (apparent westerly movement about the earth's polar axis). What remained, then, was to discover and design an automatic means of following the sun in its declination course (apparent north and south movement along a plane intersecting the polar axis).

To understand the requirements of automatic, mechanical declination adjustment, it is necessary to think about the sun-earth relationship in its actual, as well as apparent, relationship. That is, the earth revolves in an orbit around the relatively stationary sun in the plane of the ecliptic, and simultaneously rotates about its polar axis which is tilted 23½ degrees with respect to the ecliptic plane.

The orbital movement of the earth, when considered by itself, accounts for one apparent revolution of the sun around the earth in the course of a year. Thus the sun makes one apparent great circle over the earth's surface and in doing so crosses twice over the great circle of the earth's equator at an angle of 23½ degrees. Therefore, during one solar year (365¼ solar days), 366¼ solar days are accounted for by the earth's axial rotation, and one negative ($-1$) solar day is accounted for by the earth's orbital travel.

Although the principles underlying the invention's operation are capable of being perceived from either actual or apparent viewpoints, the foregoing comprises the essence of the actual viewpoint however carried out and is sufficient to establish the invention's theoretical integrity.

PRINCIPAL PARTS, RELATIONSHIP AND MOVEMENT OF THE INVENTION

Hence was conceived the declination disk whose flat surfaces are oriented parallel to the ecliptic plane for direct tracking with collectors (see FIGS. 1 and 2 of the drawings) and whose flat surfaces are oriented parallel to a plane which bisects ecliptic and equatorial planes for indirect tracking with reflectors (see FIGS. 11 and 12 of the drawings), said declination disk rotatably connected to a rotating polar shaft and said declination disk having uniform movement about the polar shaft one revolution per year as well as uniform movement with the polar shaft as said polar shaft rotates uniformly one revolution per day.

Careful heed must be given to the prepositional phrases "about the polar shaft" and "with the polar shaft" because the declination disk, when properly operating, has two drive means imposed on it:

1. A drive means "about the polar shaft" to account for the earth's annual orbital rotation, and
2. A drive means "with the polar shaft" to account for the earth's daily axial rotation.

Throughout this application no mention, other than here, is made concerning the direction of annual rotation of the declination disk relative to the polar shaft. This is because the declination disk will perform its proper function by rotating in either direction annually about the polar shaft.

However, it is well to note that when the declination disk rotates about the polar shaft in the same direction as polar shaft rotation, the declination disk will remain parallel to the ecliptic plane (direct tracking). It is less cumbersome to assume that this is the only workable direction of rotation of the declination disk relative to the polar shaft. Therefore, the foregoing assumption is maintained throughout this application.

Nevertheless, after the invention's operation is fully comprehended, it will be evident that identical declination adjustment may be effected by annually rotating the declination disk about the polar shaft in a direction opposite to polar shaft rotation, wherein the declination disk will be parallel to the ecliptic plane only at the solstices (direct tracking).

PRELIMINARY INTRODUCTORY DISCUSSION OF CORRECTIVE COMPENSATION

The uniform rate clockwork which is used to drive the mechanical tracker is, of course, variously in error with the predictably irregular time indicated by a sundial, thereby complicating accurate mechanical sun tracking. Hence, consideration must be given to the two facts that the earth's orbit is eliptical resulting in orbital speed variations which affect the length of each solar day, and that the earth's axis is tilted with respect to the ecliptic plane resulting in apparent speed variations of the sun with respect to the equator.

Right ascension tracking errors up to approximately plus and minus 4 degrees, and declination tracking errors up to approximately 1¼ degrees will be experienced if corrective compensation is not applied to polar shaft and declination disk drive means.

Corrective compensation is of two varieties: Orbital, and Angular.

Orbital compensation refers to compensation which is required as a result of the earth's orbit around the sun being eliptical. Orbital compensation is applied in two ways:

1. Orbital *major* compensation is applied to the polar shaft drive means by adding the oscillating movement of an "equation of time" cam follower to the otherwise uniform movement of the polar shaft.

2. Orbital *minor* compensation is applied to the declination disk drive means by locating the drive means eccentrically to the longitudinal axis of the polar shaft thereby imposing a non-uniform movement of the declination disk about the polar shaft.

Angular compensation refers to compensation which is required as a result of the earth's axis of rotation being tilted 23½ degrees with respect to the ecliptic plane. Angular compensation is applied by tilting the declination disk drive means so that said drive means is parallel to the plane surfaces of the declination disk.

A more thorough discussion of corrective compensation will be found in the appropriate sections of the detailed description which follows.

BRIEF SUMMARY

My sun tracking mechanism operates on the basic principle of the equatorial mount with the novel addition of a declination disk which rotates one revolution per year about the polar shaft while rotating with the polar shaft one revolution per day, thereby providing long range, accurate, and automatic sun tracking in both right ascension and declination courses.

The sun tracking mechanism has its primary application with focusing or concentrating collectors with, preferably, a central externally mounted stationary target, the heat absorbed by said target being harnessed for any variety of appropriate uses such as: Residential heating, absorption cooling, conversion to electricity, etc.

Additionally, the tracking mechanism may be modified for operation as an heliostat. The heliostat configuration is ideal for solar telescopes, solar furnaces as well as other conventional applications.

Perfectly accurate sun tracking is possible by the incorporation of corrective compensating means applied to the main drives of the sun tracking mechanism.

DESCRIPTION OF THE SEVERAL VIEWS

FIG. 1 is a front elevational view of my sun tracking mechanism embodying the basic form of my invention as it is used with collectors.

FIG. 2 is a side elevational view embodying the basic form of the invention as it is used with collectors wherein section is taken substantially as indicated by line 2—2 of FIG. 1.

FIG. 3 is a front elevational view depicting a partial modification of the invention embodying the preferred parallelogram mount structure.

FIG. 4 is a side elevational view depicting a partial modification of the invention embodying a preferred parallelogram mount structure.

FIG. 5 is a front elevational view depicting a partial modification of the invention with means of orbital major compensation.

FIG. 6 is a side elevational view depicting a partial modification of the invention with means of orbital major compensation.

FIG. 7 is a front elevational view depicting a partial modification of the invention embodying a preferred means of declination disk drive with angular compensation and orbital minor compensation applied to the declination disk.

FIG. 8 is a plan view of the declination disk eccentrically positioned to facilitate preferred means of disk drive with orbital minor compensation.

FIG. 9 is a front elevational view depicting a partial modification of the invention embodying an alternate means of declination disk drive with orbital minor compensation.

FIG. 10 is a plan view of alternate means of declination disk drive with orbital minor compensation.

FIG. 11 is a front elevational view depicting a partial modification of the invention as it is used with reflectors.

FIG. 12 is a side elevational view depicting a partial modification of the invention as it is used with reflectors.

FIG. 13 is a top elevational view depicting a partial modification of the invention as it is used with reflectors.

DETAILED DESCRIPTION

Having reference to the drawings, FIGS. 1 to 13 inclusive, my sun tracking mechanism has a polar shaft 10, a support structure 12, a declination disk 13, and a mount structure 17, 18 and 19 for supporting and positioning a collector 23 or reflector 24 in alignment with a target 25 and the sun.

Polar Shaft

Polar shaft 10 has rotational bearing support in support structure 12 and is oriented with its longitudinal axis 11 parallel to the earth's axis of rotation. Polar shaft 10 is caused to rotate uniformly one revolution per day in a direction opposite to the earth's rotation about its axis by drive means 26.

Motor with worm of drive means 26 is attached to support structure 12 in FIGS. 1 and 2. Worm gear of drive means 26 is attached concentrically and perpendicularly to polar shaft 10.

Polar axis 11 is the longitudinal axis of polar shaft 10.

Declination Disk

Declination disk 13 is rotatably connected to polar shaft 10.

When used with collectors 23, declination disk 13 has its solstice line 34 66½ degrees and equinox line 35 perpendicular respectively to polar axis 11. When properly operating, plane surfaces 14 and 15 of declination disk 13 remain parallel to the ecliptic plane according to the previously stated assumption.

When used with reflectors 24, declination disk 13 has its solstice line 34 78¼ degrees and its equinox line 35 perpendicular respectively to polar axis 11. When properly operating, plane surfaces 14 and 15 of declination disk 13 remain parallel to a plane which bisects ecliptic and equatorial planes according to the previously stated assumption.

Declination disk 13 has drive means 27 which may be either distinct from said declination disk 13 as in FIG. 9 or integral at rim surface 16 as in FIG. 7. Drive means 27 may be concentric with polar axis 11, or eccentric as illustrated in FIGS. 8 and 10, arrows "A" and "B," or perpendicular to polar axis 11 as illustrated in FIG. 9 and as implied by FIGS. 1, 2, 11 and 12, or at an angle to polar axis 11 as shown in FIG. 7.

When declination disk 13 drive means 27 is distinct from said declination disk 13 as in FIG. 9, drive means 27 mounting bracket 36 is supported by member 37 on which said bracket 36 is free to move radially with respect to polar axis 11 to enable spring 38 to hold said bracket 36 and motor and worm of drive means 27 enmeshed with drive means 27 gear.

When declination disk 13 drive means 27 is integral with said declination disk 13 at rim surface 16 as in FIG. 7, bracket 36 is supported by member 29 of parallelogram mount structure 18 and said bracket 36 serves two functions:

1. It serves as a motor mount in the same way as described in the immediately preceeding paragraph, and
2. Its sliding contact surfaces 39 provide the necessary moving contact between member 29 of parallelogram mount structure 18 and plane surfaces 14 and 15 of declination disk 13.

Mount Structure

Mount structures 17, 18 and 19 designate the various forms that are used in the invention's modifications shown in FIGS. 1, 2, 3, 4, 11, 12 and 13 for supporting and positioning collectors 23 and reflectors 24 with respect to the sun and their respective targets 25. Arrow "S," illustrated in FIGS. 2 and 13, indicates the direction of the sun's rays.

Mount structure 17, 18 and 19 has axis 20 held parallel to plane surfaces 14 and 15 of declination disk 13 by the combination of its pivot pin 21 connection to polar shaft 10 and moving contact with any one or combination of surfaces 14, 15 and 16 of declination disk 13. Mount structure 17, 18 and 19 rotates simultaneously about polar axis 11 and declination axis 32 by reason of its pivot pin 21 connection to polar shaft 10 and its moving contact with any one or combination of surfaces 14, 15 and 16 of declination disk 13.

Mount structure 17, 18 and 19 axis 20 is a line passing through centers of rolling members 22 and parallel to declination disk 13 plane surface 14, as illustrated in FIGS. 1, 2, 3, 4, 11, and 12. Mount structure 18 axis 20 is the longitudinal axis of parallelogram member 29 in structure illustrated in FIG. 7.

Declination axis 32 is the longitudinal axis of pivot pin 21. Movement about declination axis 32 is always in a plane which intersects polar axis 11.

For collector 23, the total declination movement is 47 degrees or 23½ degrees on either side of the 90 degree (equinox) position.

For reflector 24, the total declination movement is 23½ degrees or 11¾ degrees on either side of the 90 degrees (equinox) position.

Two of the many possible variations of moving contact of mount structure 17, 18 and 19 on surfaces 14, 15 and 16 of declination disk 13 are illustrated in this application:

1. Moving contact with upper plane surface 14 of declination disk 13 by means of rolling contact members 22 as illustrated in FIGS. 1, 2, 3, 4, 11 and 12.
2. Moving contact with upper plane surface 14 and lower plane surface 15 of declination disk 13 by means of sliding contact mating surfaces 39 of bracket 36 as illustrated in FIG. 7.

Two mount structure 17 and 18 variations for collectors 23 and one mount structure 19 for reflectors 24 are illustrated in this application:

Basic Type

A single element mount structure 17 is illustrated in FIGS. 1 and 2 for supporting and positioning collectors 23 and target 25 combinations, wherein said combinations are fastened thereon in such a way that collector 23 axis 40 is held parallel to plane surfaces 14 and 15 of declination disk 13.

Collector 23 axis 40 is formed by centerline from collector 23 to target 25.

Parallelogram Type

A parallelogram mount structure 18 is illustrated in FIGS. 3 and 4 for supporting and positioning collectors 23, wherein a target 25 is externally mounted in fixed position along the extended polar axis 11 thereby eliminating the need for rotating or flexible fittings that would generally otherwise be associated with a target 25 as that illustrated in FIGS. 1 and 2.

Parallelogram mount structure 18 has variable parallelogram construction of component members 28, 29, 30 and 31 pivotly connected which keep collector 23 axis 40 properly aligned with the sun and parallel to plane surfaces 14 and 15 of declination disk 13 as well as maintaining a constant distance between collector 23 and target 25, said constant distance being a requirement of collectors 23 which have a fixed focal length.

It is evident that since parallelogram mount structure 18 allows the advantage of an externally mounted stationary target 25, said target 25 would be spherically shaped to accomodate the requirement presented by collector 23 fixed focal length.

Parallelogram member 31 is an extension fixed to polar shaft 10.

Counterweight 33 is used to balance the assembly of polar shaft 10, parallelogram mount structure 18 and attachments thereto. Additionally, counterweights may be used with declination disk 13, orbital major compensation pivot arm 46, and support structure 12 (depending on support structure 12 design).

Double Element Type

A double element mount structure 19 is illustrated in FIGS. 11, 12 and 13 for supporting and positioning reflectors 24, wherein lower element 41 of said double element mount structure 19 is basically the same as single element mount structure 17 with the addition of upper element 42.

Upper element 42 is rotatably connected to lower element 41 and has suitable drive means 48 to rotate upper element 42 uniformly at one half polar shaft 10 speed and in the direction of arrow "D" with respect to lower element 41. The rotation of upper element 42 by drive means 48, when combined with the rotation of polar shaft 10 as indicated by arrows "C," results in upper element 42 rotating in the same direction as arrow "E" but at one half the speed of polar shaft 10.

As with declination disk 13, drive means 48 for upper element 42 may be either distinct from said upper element 42 such as an attached gear or integral with a surface of upper element 42 as is illustrated in FIGS. 11, 12 and 13.

Upper element 42 of double element mount structure 19 has movement equal to the combination of two movements one of which is declination movement with said lower element 41 of double element mount structre 19 and the other of which is rotational movement in the same direction as but at a rate which is one half of the rotation of polar shaft 10.

Lower element 41 of double element mount structure 19 rotates simulaneously about polar axis 11 and declination axis 32 by reason of its pivot pin 21 connection to polar shaft 10 and moving contact with any one or combination of surfaces, 14, 15 and 16 of declination disk 13.

It is evident that FIGS. 1, 2, 3, 4, 11, 12 and 13 illustrate the invention in the September equinox position. This is ascertained by combining the foregoing assumption with the information derived by observing the position of mount structure 17, 18, 19 relative to declination disk 13. FIG. 7 illustrates the invention in the winter solstice position. All other positions may be readily imagined.

By understanding FIG. 13 to illustrate the invention in the sunrise position, wherein target 25 is stationed south (northern hemisphere) of the sun tracking mechanism, it will be found convenient to visualize how reflector 24 movement throughout the day is such that the reflected light from the sun is always aimed at said target 25.

Collectors

Collector 23 is a means such as a Fresnal lens, magnifying glass, parabola, absorption panel, etc. for heating a target 25, wherein when properly positioned and operating on the sun tracker disclosed herein, the sun, collector 23 and target 25, form an extended collector 23 axis 40 straight line.

Reflectors

Reflector 24 is a means such as a polished flat or curved surface to reflect the sun's rays for heating a target 25, wherein when properly positioned and operating on the sun tracker disclosed herein, the included angle of reflector 24 surface to sun remains equal to the included angle of reflector 24 surface to target 25. It is evident that reflector 24, when mounted on double element mount structure 19, has movement which allows a stationary target 25 and said movement of reflectors 24 is exactly one half of collector 23 movement in order to conform to the principle of reflection wherein the angle of incidence equals the reflected angle. Reflectors 24 are mounted back to back in pairs and used on alternate days.

Corrective Compensation

Orbital Major:

Since, in the basic configuration of FIGS. 1 and 2, polar shaft 10 is rotated by drive means 26 which operates uniformly at the mean solar time rate, collector 23 axis 40 will vary in its error with respect to alignment with the sun between the extremes of approximately plus and minus four degrees through the year. If further tracking accuracy is required than that provided by the basic tracker configuration illustrated in FIGS. 1 and 2, then another mean rate drive means 43 may be combined with the existing polar shaft 10 drive means 26 to form apparent rate rotation of polar shaft 10. Declination disk 13, of course, is subjected to this corrective movement by reason of its rotation "with the polar shaft."

Orbital major compensation is accomplished by uniformly rotating a suitably supported cam 44 about its axis one revolution per year.

Cam 44 support bracket 45 has a fixed attachment to support structure 12. Cam 44 with its drive means 43 is illustrated in FIGS. 5 and 6. The curve of cam 44 is derived by using "equation of time" data which may be found in an ephemeris of a nautical almanac. The amplitude of said curve is dependent on the distance of cam 44 axis of rotation from polar axis 11 as measured in the plane of FIG. 6.

An arm 46 which slowly oscillates about polar axis 11 has attached to it cam follower 47 which guides the compensating movement of said arm 46. Cam 44 and cam follower 47 are so positioned that they are both the same distance from polar axis 11 as illustrated in FIG. 6.

Motor and worm of polar shaft 10 drive means 26 are removed from their support structure 12 mounting position in FIGS. 1 and 2 and are remounted on arm 46 illustrated in FIGS. 5 and 6 thereby combining arm 46 movement with polar shaft 10 movement to result in rotation of polar shaft 10 which is equivalent to the apparent solar time rate.

Cam 44 is shown cylindrical, but it may be plate or grooved plate type.

Cam follower 47 may be a pin as shown or roller, slider, etc.

Arm 46 may be rotatably connected directly to polar shaft 10 as illustrated in FIGS. 5 and 6 or may be connected in some manner to support structure 12 in such a way that said arm 46 will still pivot about polar axis 11.

Orbital Minor:

Without orbital minor compensation, collector 23 axis 40 will be variously in error with sun alignment by approximately 1¼ degrees at the solstice positions. This error is caused by the fact that the earth's orbit is eliptical and the time between equinoxes when measured through December is about one week shorter than when said time is measured through June.

This error may be removed by orienting declination disk 13 drive means 27 eccentrically to polar axis 11 as illustrated in FIGS. 7 through 10. In this position, the otherwise uniform rotation of declination disk 13 about polar shaft 10 will now be at a slightly non-uniform rate allowing collector 23 axis 40 to arrive at the solstice, equinox, and all other positions almost perfectly in phase with the sun.

The amount of eccentricity for drive means 27 and location thereof is determined thusly: Approximately 179 days are required for the earth to make the trip from equinox to equinox through December or 49 percent of a year. Approximately 186 days are required for the earth to make the trip from equinox to equinox through June or 51 percent of a year. Therefore, if worm type drive means 27 is utilized, a solstice line 34 is drawn in such a way that 50 percent of the worm teeth are on each side of said solstice line 34, and an equinox line 35 is drawn perpendicularly to said solstice line 34 that 49 percent of the worm teeth are on one side of said equinox line 35 and 51 percent of worm teeth are on the other side of said equinox line 35.

For the modification illustrated in FIGS. 9 and 10, the intersection of these two lines, solstice and equinox, must be located on polar axis 11.

Solstice line 34 is an on-center line drawn from the December 21-22 midpoint to the June 21-22 midpoint, or a division of 50 percent and 50 percent. Equinox line 35 is an off-center line drawn from the September 23 midpoint to the March 21 midpoint, or a division of 49 percent and 51 percent. These two lines are perpendicular to each other.

Angular Compensation:

The phrase "almost perfectly" was made in a preceeding paragraph, because one final refinement in compensation can be made to achieve theoretically perfect mechanical sun tracking. This is effected by also tilting the eccentrically positioned drive means 27 so that said dive means 27 is parallel to plane surfaces 14 and 15 of declination disk 13 rather that parallel to the equatorial plane (perpendicular to polar axis 11).

In this angular position a slight further non-uniformity of movement is imposed on declination disk 13 as it rotates once a year about polar shaft 10. The tilting of drive means 27 compensates for the predictable irregularities associated with the earth's axis being at an angle to the ecliptic plane.

It is to be admitted that only a small amount of accuracy is gained by tilting drive means 27. However, much is gained from a manufacturing standpoint in that drive means 27 can, in this tilted position, be easily combined with declination disk 13 thereby eliminating some unnecessary weight and material in the invention. This aspect makes this particular modification of the invention the preferred one, regardless of the need or desire for either or both orbital minor and angular compensations.

In this tilted configuration, the eccentric point relating to orbital minor compensation must be positioned in such a way that a line extending perpendicularly from the intersection of equinox and solstice lines, 35 and 34 respectively, must pass through the point defined by the intersection of polar and declination axes, 11 and 32 respectively. FIGS. 7 and 8 are appropriately positioned relative to each other to facilitate understanding this point.

The eccentricity, then, whether applied to the tilted configuration of FIG. 7 or perpendicular configuration of FIG. 9, must be appropriately related to declination disk 13 angle and drive means 27 location. That is, a careful comparison of FIGS. 7 and 8 with FIGS. 9 and 10 will show the illustrated directions of eccentricity to be exactly 180 degrees apart relative to bracket 36. Either configuration is workable provided collector 23 is appropriately placed opposite bracket 36 for FIG. 7 (as implied by member 30 portion illustrated) and on the same side as bracket 36 for FIG. 9. If FIG. 9 had a mount structure 17, 18 or 19, said mount structure 17, 18 or 19 would necessarily have to be in the summer solstice position to be compatible with eccentric drive means 27 illustrated in FIG. 9.

CONCLUDING REMARKS

The Preferred Embodiment of the Invention

From the above description of the invention in which it is shown incorporated in different arrangements, the preferred means of carrying out the invention, whether incorporating optional compensating means or not, includes the following:

Wherein when used with collectors 23, the basic form of the invention illustrated in FIGS. 1 and 2 is modified to incorporate the parallelogram mount structure 18 of FIGS. 3 and 4, and the declination disk 13 drive means 27 of FIGS. 7 and 8.

Wherein when used with reflectors 24, the basic form of the invention illustrated in FIGS. 1 and 2 is modified to incorporate the double element mount structure 19 and declination disk 13 angle of FIGS. 11 and 12, and the declination disk 13 drive means 27 of FIGS. 7 and 8.

Miscellaneous Alternates Within the Spirit and Scope

It is of course to be understood, however, that the particular embodiments of the invention herein disclosed are for illustrative purposes only, and that various changes in design, structure and arrangement may be made therein without departing from the spirit and scope of the invention or appended claims.

With respect to the above mentioned various changes in design, structure and arrangement:

Drive means 26, 27, 43 and 48 illustrated in this application are constant speed electric clock motor with worm enmeshing worm gear teeth and drive polar shaft 10, declination disk 13, cam 44, and upper element 42 of double element mount structure 19. Other forms of drive means may be used such as: Chains and sprockets, belts and pulleys (gear type), spur gears, bevel gears, peg gears, etc. which may be actuated by constant uniform movement devices such as: Electric motors, wind-up escapement type motors, or other timer type actuators which supply periodic uniform movements.

When drive means 27 uses an electric motor, external electrical power may be delivered to said motor via slip rings and brushes at a convenient location on polar shaft 10 and support structure 12.

Only one support structure 12 is illustrated in FIGS. 1 and 2. A tripod or pedestal with or without latitude adjustment capability may be used.

The sun tracking mechanism may carry a plurality of collectors 23 with respective targets 25 or a plurality of reflectors 24 and respective targets 25.

There may be a plurality of sun tracking mechanism wherein one or more "slave" tracking mechanisms derive their operation from a "master" tracking mechanism.

Having thus described my invention, what I claim as new and desire by Letters Patent of the United States is set forth in the following one independent claim and nine dependent claims (making ten claims in all):

1. An automatic biaxial sun tracking mechanism for solar energy utilization devices comprising means for continuously orienting said devices relative to the sun, said means including:
   A. a polar shaft oriented with its longitudinal axis parallel to the earth's axis of rotation, said polar shaft having suitable means for rotation in its bearing support;
   B. a declination disk rotatably connected to said polar shaft and oriented with its plane surfaces tilted with respect to the polar axis, said declination disk having suitable means for rotation relative to said polar shaft;
   C. a mount structure for supporting and positioning said solar energy utilization devices, said mount structure being pivotly connected by means of a structure arm to said polar shaft and said structure arm also having moving contact with a surface or surfaces of said declination disk.

2. In a mechanism as defined in claim 1, wherein said declination disk has its plane surfaces oriented so that said surfaces are permitted to remain parallel to the sun's ecliptic plane.

3. In a mechanism as defined in claim 1, wherein:
   A. said declination disk has its plane surfaces oriented so that said surfaces are permitted to remain parallel to a plane which bisects the earth's equatorial plane and the sun's ecliptic plane;
   B. said mount structure comprising (1) a lower element pivotly connected to said polar shaft and having moving contact with a surface or surfaces of said declination disk;

(2) an upper element, on which said solar energy utilization devices are mounted, rotatably connected to said lower element and with suitable means for rotation relative to said lower element.

4. In a mechanism as defined in claim 1, wherein said mount structure has pivoting connection to said polar shaft and moving contact with said declination disk by means of multiple structure arms having a pivoting parallelogram construction.

5. In a mechanism as defined in claim 1, wherein each said means for rotation is one of the following:
   A. unidirectional and continuously operable,
   B. unidirectional and intermittently operable,
   C. reversible and continuously operable,
   D. reversible and intermittently operable.

6. In a mechanism as defined in claim 2, wherein mechanism movement is as follows:
   A. said polar shaft rotates uniformly one revolution per day in a direction opposite to the earth's axial rotation;
   B. said declination disk has the combined movements of uniform rotation about said polar shaft one revolution per year and rotation with said polar shaft;
   C. said mount structure rotates simultaneously about polar and declination axes by means of its pivot connection to said polar shaft and moving contact with a surface or surfaces of said declination disk.

7. In a mechanism as defined in claim 3, wherein mechanism movement is as follows:
   A. said polar shaft rotates uniformly one revolution per day in a direction opposite to the earth's axial rotation;
   B. said declination disk has the combined movements of uniform rotation about said polar shaft one revolution per year and rotation with said polar shaft;
   C. said lower element of mount structure rotates simultaneously about polar and declination axes by means of its pivot connection to said polar shaft and moving contact with a surface or surfaces of said declination disk;
   D. said upper element of mount structure has movement equal to the combination of two movements, one of which is declination movement with said lower element and the other of which is rotational movement in the same direction as but a rate which is one half of said polar shaft rotation.

8. In a mechanism as defined in claim 1, wherein corrective orbital minor compensation is accomplished by means of a drive with said declination disk, said drive being oriented perpendicular and eccentric to the polar axis.

9. In a mechanism as defined in claim 1, wherein corrective angular and orbital minor compensations are accomplished by means of a drive with said declination disk, said drive being oriented parallel to said declination disk and eccentric to the polar axis.

10. In a mechanism as defined in claim 1, wherein corrective orbital major compensation is applied to said means for rotation of said polar shaft by mounting said means for rotation on an arm which is pivotly connected to a suitable support, said arm also having a follower, said follower engaging a cam, said cam having suitable means for rotation relative to a support structure.

* * * * *